July 4, 1950  H. M. CURL  2,514,121
TOOL
Filed Nov. 30, 1944
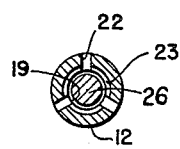
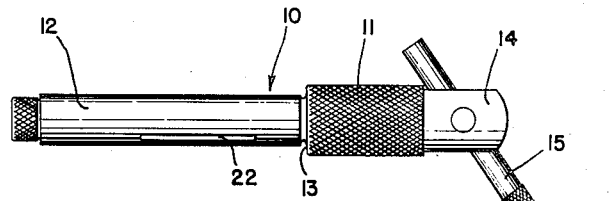
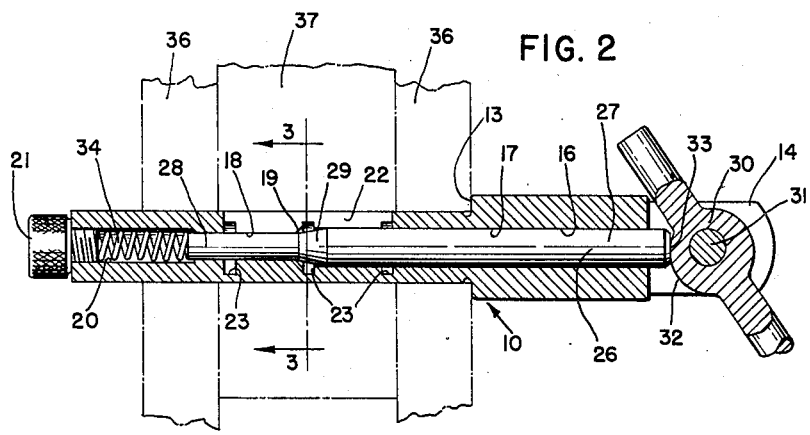
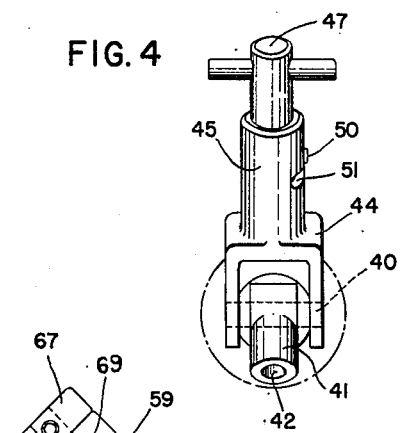
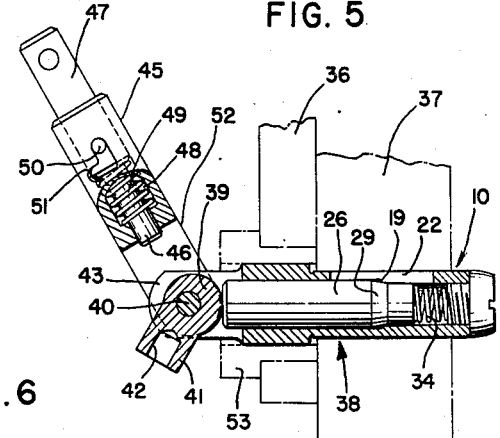
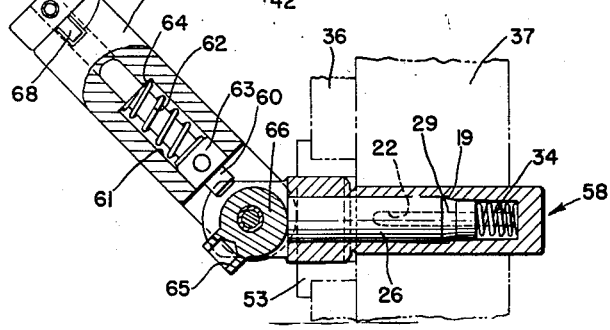
INVENTOR.
HENRY M. CURL
BY George F. Goodyear
ATTORNEY Patented July 4, 1950

2,514,121

UNITED STATES PATENT OFFICE 2,514,121

TOOL

Henry M. Curl, Columbus, Ohio, assignor to Curtiss-Wright Corporation, a corporation of Delaware Application November 30, 1944, Serial No. 565,982

6 Claims. (Cl. 85—2.4)

The present invention relates generally to positioning and holding devices and more particularly to a pin type tool of expandible character.

The invention resides in improvements in expandible pin type holding and positioning devices or tools utilized in connection with a jig or fixture upon which an object or workpiece is to be positioned so that the same may be fabricated, formed or machined as desired. This device is commonly referred to in the trade as a "jig pin." In use the expandible jig pin is adapted to fit into an opening in a jig and extend into or through the work such that the work is positioned in the desired position upon or with respect to the jig. The portion of the pin which is in the work or object is rendered expandible in order to fix the former in position and further to bring the openings in the jig and work into coincidence. When a plurality of openings are to be machined into a workpiece, a number of these expandible jig pins may be placed in position as the machine work progresses to maintain the work in the desired position.

Accordingly, it is an object to provide an improved jig pin type of holding device which is simple to manufacture, easily operated, accurate and positive in performing its positioning and securing function.

It is also an object to provide improved means for securing a jig pin in position and for effecting its release and removal.

A further object resides in the provision of means for improving the utility of a jig pin as a clamping and work holding device.

These and other objects will be pointed out as the nature of the invention is more fully described in connection with the accompanying drawing, in which:

Figure 1 is an elevational view of a preferred form of this invention,

Figure 2 is a sectional view of the jig pin shown in the preceding figure, the view also indicating in outline the relation of the jig and work to the pin, Figure 3 is a transverse sectional detail taken at line 3—3 of Figure 2, Figure 4 is an end elevational view of a modification of the invention, Figure 5 is a partial sectional elevational view of the device of Figure 4, the jig and work being indicated in outline, and Figure 6 is a further modification in sectional elevation of the invention.

The presently preferred embodiment of the present invention is illustrated in detail in Figures 1 through 3. In this form of the invention the jig pin or securing device takes the form of a cylindrical member 10 which is formed with an enlarged handle portion 11 and a reduced shank portion 12 whereby an exterior annular shoulder 13 is formed therebetween. The enlarged cylindrical handle section 11 is provided with a pair of axially extending ears 14 for the pivotal mounting of an operating lever 15. Certain details of the latter will be explained hereinafter. The body 10 is also provided (Figure 2) with a longitudinally extending bore which is defined by a first section 17 opening through the enlarged handle 11 between the pair of projecting ears 14, and an intermediate portion 18 having a reduced diameter such that there is provided between these bore portions an internally directed shouldered seat 19. This seat surface 19 is preferably of rather sharply tapered formation. There is provided a third bore portion 20 which opens outwardly therefrom and is adapted to receive a threaded closure cap or plug 21. Spaced around the circumference of the body portion 12 and intermediate the length of shank 12 is formed one or more circumferentially spaced, longitudinally extending slots or apertures 22, each of which extends through the body wall in the zone of the tapered internal seat 19 such that the internal surface is positioned preferably intermediate the ends of each of the slots. Furthermore, one or more internal annular recesses 23 are formed in the zone of the slots, in the manner clearly indicated in Figure 2 such that the body wall in the zone of these slots and between the recesses is made flexible or expandible. A further detail of the disposition of radial slots 22 and annular recesses 23 is indicated in Figure 3.

A plunger member or slider 26 is operatively mounted within the bore of the body 10 such that a first portion 27 thereof is positioned within the bore portion 17, and a second reduced portion 28 is adapted to be received in the reduced bore portion 18. Accordingly, there is provided a tapered surface 29 between the plunger portions 27 and 28. This tapered surface 29, preferably of a gradual slope, is arranged to cooperate and engage with the internal tapered seat 19 for a purpose later appearing. The plunger member 26, mounted for movement relative to the body 10, is actuated by means of a cam member 30 which is formed as an integral part of the lever 15 before noted. The cam 30 is mounted for pivotal movement about a pivot pin 31, the latter being secured in suitable apertures formed in each of the mounting ears 14. A cam surface 32 having a very gradual rise or inclination is formed on the portion 30 of lever 15. With the lever 15 in the position indicated in Figures 1 and 2 and with the end face 33 of plunger 26 resting on the cam surface 32 the present jig pin device is in its inoperative position.

In order to maintain the contact between plunger face 33 and cam surface 32 there is provided within the body bore section 20 at the opposite end of the pin a resilient element or coil spring 34 which is adapted to abut the threaded plug element 21 and to ride against the end face of the plunger portion 28 as clearly shown. Therefore, as the lever 15 is rotated in a clockwise direction, as viewed in the drawing, the cam surface 32 will act to move plunger 26 to the left against the action of the spring 34. In so doing the tapered surface 29 will be moved into engagement with the tapered seat 19 and due to the wedging action taking place between these dissimilar tapered surfaces the slotted body portion of pin 10 will be expanded in a radial direction. The expandible or flexible character of the wall of the body 10 within the zone of the tapered seat 19 is due to the combination of the internal annular grooves 23 and the radial slots 22. However desirable, flexibility or expandibility of the wall section can be obtained with the slots alone or by making the body wall section of a suitably thin section.

It should be pointed out that the longitudinal axis of the plunger member 26 is arranged to intersect the axis of the pivot pin 31 so that the cam portion 30 formed on the lever 15 will be of an irreversible or self-locking character. Thus it is required that the lever 15 be moved manually either in its operative or inoperative direction in order to effect movement of the member 26. The resilient member 34 is adapted to urge member 26 to its inoperative position at all times upon release of the cam in the manner already noted.

A jig pin device of the above character is adapted to be used in connection with the securement or positioning of a workpiece or object upon a suitable jig or other supporting means during the performance of machining operations or assembly of the workpiece. Referring to Figure 2 there is indicated in outline portions of a jig 36 and an object or workpiece 37 positioned on the jig by means of the jig pin just described. In use the pin 10 is adapted to be inserted through suitable apertures formed in the jig and the body such that the flexible or expandible wall portion of the pin 10 lies within the workpiece 37 and also such that the external shoulder 13 rests against the surface of one portion of the jig 36 as shown. With the jig and work in this position the lever 15 may be pivoted in a clockwise direction in order to effect expansion of the flexible wall into frictional engagement with the internal surface of the bore or aperture formed in the workpiece. Thus the pin 10 serves to clamp the workpiece 37 to the jig 36 and also locates and brings into axial coincidence the respective apertures formed in the jig and workpiece.

A modification of the present invention is illustrated in Figures 4 and 5 and as there shown includes a relatively shorter jig pin 38 which is substantially identical in its basic features with the one described in Figures 1 and 2. In the modified form the lever 15 and integral cam 30 of the first embodiment is now replaced by a cam 39 pivotally mounted on a pin 40 and having formed integral therewith a short body portion 41 which is provided with an axial socket or recess 42. In the present arrangement the pivot pin 40 is also adapted to extend outwardly of mounting lugs 43 to receive a yoke member 44 of a tubular handle member 45. The handle is adapted to house a pin element 46 which is formed as an integral part of a handle plunger 47. Within a suitably formed chamber 48 provided in the tubular member 45 there is positioned a spring element 49 which is adapted to encircle the pin and urge it and hence plunger 47 in an outward direction. Means for limiting outward displacement of the plunger 47 comprises a pin 50 which is confined to move in an L-shaped slot 51 formed in the side wall of member 45.

Operation of the jig pin illustrated in Figures 4 and 5 is as follows: The plunger member 26 of the jig pin 38 is in its inoperative position when the cam 39 is moved to a substantially horizontal position. In order to effect operative displacement of the plunger 26 by means of the cam 39 the yoke member 44 is moved to a horizontal position or until pin element 46 can be moved to engage the axial socket 42 in member 41. Thereafter, inward movement followed by a slight rotation of the handle plunger 47 will cause pin 50 to move down and then laterally in the slot 51, thereby locking pin 46 within the socket 42 and enabling rotation of the cam 39. In this manner the slotted wall portion of the jig pin may be expanded sufficiently to position the work piece 37 upon the jig support 36. A feature of the present modification resides in the fact that the handle member 45 may be released from the cam 39, once the latter is placed in operative positions, for rotation in a clockwise direction to a substantially vertical position at which position the side surfaces 52 of the yoke member 44 will be brought into engagement with a jig bushing element indicated in outline at 53. Upon contact between the surface 52 of yoke 44 and the end face of the bushing 53 the handle assembly 45 and 47 may be utilized as a lever in order to draw workpiece 37 snugly against the surface of the jig 36. In the same fashion the pin 36 may be withdrawn from the workpiece 37 after the plunger 26 has been retracted by spring 34 by utilizing the handle assembly 45 and 47 as a withdrawing lever. This latter condition may occur in the event that the jig pin should for any reason tend to stick or freeze in the aperture provided in the workpiece.

A still further modification illustrated in Figure 6 includes a jig pin 58 having a separate handle portion 59 which is provided with a releasable cam actuating pin member 60. In this case the pin 60 is constantly urged outwardly of its mounting socket 61 by means of a coil spring 62 which is compressed between a slide block 63 pinned to element 60 and an internal shoulder 64. In order to retract the pin 60 to effect engagement thereof within the socket 65 of the pivotal cam 66 it is necessary to withdraw the pin by handle 67 and to rotate the same through a small angle such that lugs 68 formed upon the under surface of the handle will ride upon the end face of the member 59. In the position shown in the drawing lugs 68 are received in a suitable recess or notch 69 cut axially into the end face of the body member 59. The operation of the jig pin just described is substantially similar to that of the modified form illustrated in Figures 4 and 5. However, in this case the jig pin is formed with a closed end and the return spring 34 is assembled by inserting it from the open end of the pin body, after which the plunger member 26 may be assembled in the pin body.

The foregoing detailed description has covered several forms of the present invention and has pointed out certain features and advantages therefor, but it should be recognized that other forms and structural arrangements may come to mind after understanding this invention and accordingly it is intended that all such embodiments be defined by the appended claims.

I claim:

1. In a device for securing an apertured workpiece to an apertured support, a body member having a reduced portion for insertion into the apertures of the workpiece and support, and having an enlarged shoulder for engaging a surface adjacent one aperture, said body having a longitudinal bore having a closure at one end, the walls of the reduced portion of the body having longitudinal slots with closed ends, and a circumferential shoulder formed in the bore intermediate the ends of said slots, a member slidable in said bore and having a tapered portion engageable with said circumferential shoulder for expanding the slotted wall portions of the body when moved in the bore in one direction, resilient means confined in the bore between said closure and the inner end of the slidable member for urging the latter in the opposite direction, said body having furcations at the end thereof opposite to the closure, a lever disposed between and pivoted to said furcations on an axis transverse to the axis of the bore, and the lever having a cam surface thereon engaging the outer end of the slidable member for moving the latter in the first mentioned direction upon pivotal movement of the lever.

2. In an expandible device, a body member having a longitudinally slotted expandible portion for insertion in an aperture of a workpiece or the like and having a bore therein provided with a shoulder, a member slidable in the bore and having a tapered portion engageable with said shoulder for expanding said portion of the body when the slidable member is moved in one direction in said bore, resilient means in said bore for urging movement of the slidable member in the opposite direction, the body having furcations at one end thereof, and a lever disposed between said furcations and pivoted thereto on an axis substantially transverse of the axis of the bore, and said lever having a cam surface thereon engaging the slidable member for moving the latter in the first mentioned direction upon pivotal movement of the lever.

3. In an expandible device, a body member having an expandible portion for insertion in an aperture of a workpiece or the like, means including a member slidable longitudinally in said expandible portion for expanding the latter, a cam mounted for pivotal movement relative to the body upon a transverse axis and engaged with the slidable member for effecting longitudinal movement of the latter, a lever mounted for pivotal movement relative to the body and to the cam on said axis, and releasable means for connecting the lever and cam for movement as a unit about the pivot axis.

4. In an expandible device, a body member having an expandible portion for insertion in an aperture of a workpiece or the like, means including a member slidable longitudinally in said expandible portion for expanding the latter, the body member having furcations at one end thereof, a cam disposed between said furcations and mounted for pivotal movement relative thereto on a transverse axis, said cam engaging the slidable member for effecting longitudinal movement of the latter, a lever having a bifurcated end portion mounted for pivotal movement relative to said furcations and to said cam, and releasable means including a pin slidably mounted on said lever for connecting the lever and cam for movement as a unit about the pivot axis.

5. In an expandible device, a body member having an expandible portion for insertion in an aperture of a workpiece or the like, means including a member slidable longitudinally in said expandible portion for expanding the latter, a cam mounted for pivotal movement relative to the body upon a transverse axis and engaged with the slidable member for effecting longitudinal movement of the latter, a lever mounted for pivotal movement relative to the body and to the cam on said axis, said lever having a bore therein and said cam having a recess, a pin slidable in the bore for extension into said recess to secure the lever and cam to movement as a unit about the pivot axis, and for retraction from the recess to allow pivotal movement of the lever free of the cam.

6. In a device for securing an apertured workpiece to an apertured support, a body member having a reduced portion for insertion into the apertures of the workpiece and support, and having a shoulder adjacent said reduced portion for engaging a surface adjacent one aperture, said body having a longitudinal bore closed at one end, the walls of the reduced portion having longitudinal slots with both ends thereof closed, and a circumferential shoulder formed in the bore intermediate the ends of the slots, a member slidable in the bore and having a circumferential shoulder engageable with the first-mentioned shoulder for expanding the slotted wall portion of the body when moved in the bore in one direction, at least one of said shoulders being of conic form, resilient means confined in the bore between the closed end thereof and the inner end of the slidable member for urging the latter in the opposite direction, a lever pivoted to said body at the end thereof through which said bore opens and upon a pivot axis substantially transverse to the axis of the bore, and the lever having a cam surface engaging the outer end of the slidable member for moving the latter in the first mentioned direction upon pivotal movement of the lever.

HENRY M. CURL.

REFERENCES CITED

The following references are of record in the file of this patent:

UNITED STATES PATENTS

| Number | Name | Date |
| --- | --- | --- |
| 257,220 | Harrison | May 2, 1882 |
| 494,502 | Whitacre | Mar. 28, 1893 |
| 1,049,173 | Turek | Dec. 31, 1912 |
| 1,191,755 | Andrews | July 18, 1916 |
| 1,285,763 | Markey | Nov. 26, 1918 |
| 1,593,955 | Schmittner | July 27, 1926 |
| 1,656,624 | Finsen | Jan. 17, 1928 |
| 1,810,275 | Howell | June 16, 1931 |
| 1,825,026 | Thomas | Sept. 29, 1931 |
| 1,852,690 | Beard | Apr. 5, 1932 |
| 2,180,030 | Bugatti | Nov. 14, 1939 |
| 2,213,379 | Bird | Sept. 3, 1940 |
| 2,320,435 | Hood | June 1, 1943 |
| 2,399,831 | Schmidt | May 7, 1946 |

FOREIGN PATENTS

| Number | Country | Date |
| --- | --- | --- |
| 23,588 | Great Britain | 1901 |
| 370,667 | Italy | Apr. 26, 1939 |